(12) United States Patent
Yim

(10) Patent No.: US 8,094,730 B2
(45) Date of Patent: Jan. 10, 2012

(54) HYBRID ERROR CONCEALMENT METHOD

(75) Inventor: Chang Hoon Yim, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 1540 days.

(21) Appl. No.: 11/466,497

(22) Filed: Aug. 23, 2006

(65) Prior Publication Data

US 2007/0153898 A1    Jul. 5, 2007

(30) Foreign Application Priority Data

Jan. 5, 2006    (KR) ................. 10-2006-0001277

(51) Int. Cl.
*H04N 7/12*    (2006.01)
(52) U.S. Cl. .......... 375/240.27; 375/240.01; 375/240.25
(58) Field of Classification Search .................. 375/240, 375/240.01, 240.12, 240.16, 240.27, 240.25
See application file for complete search history.

(56) References Cited

U.S. PATENT DOCUMENTS 7,738,561 B2 *    6/2010    Huang et al. ............. 375/240.27

OTHER PUBLICATIONS

Wang et al., The Error Concealment Feature in the H.26L Test Mode, IEEE ICIP, 2002, pp. 729-732.
Lee, et al., A New Error Concealment Algorithm for H.264 Video Transmission, IEEE ISIM, pp. 619-622, Oct. 2004.
Nasiopoulos, et al., An Improved Error Concealment Algorithm for Intra-Frames in H.264/AVC, IEEE ISCS, vol. 1, pp. 320-323, May 2005.
Wenger, H.264/AVC Over IP, IEEE Trans. Circuits Syst. Video Technol., vol. 13, No. 7, pp. 645-656, Jul. 2003.
Wiegand, et al., Overview of the H.264/AVC Video Coding Standard, IEEE Trans. Circuits Syst. Video Technol., vol. 13, No. 7, pp. 560-576, Jul. 2003.
Xu et al., H.264 Video Communication Based Refined Error Concealment Schemes, IEEE Trans. Consumer Electronics, vol. 50, No. 4, pp. 1135-1141, Nov. 2004.
Stockhammer et al., H.264/AVC in Wireless Environments, IEEE Trans. Circuits Syst. Video Technol., vol. 13, No. 7, pp. 657-673, Jul. 2003.
Jung et al., Selective Temporal Error Concealment Algorithm for H.264/AVC, IEEE International COnference on Multimedia and Expo., vol. 1, pp. 411-414, Jun. 2004.
Wenger, Common Conditions for Wire-Line, Low Delay IP/UDP/RTP Packet Loss Resilient Testing, ITU-T SG16 Doc. VCEG-N79r1, 2001.
Luttrell, et al., "New versions of packet loss environment and pseudomux tools", Q15-I-09.zip, Oct. 1999, available from http://ftp3.itu.ch/av-arch/video-site/9910_Red/q15i09.zip.

* cited by examiner

*Primary Examiner* — Allen Wong
(74) *Attorney, Agent, or Firm* — Adam Sacharoff

(57) ABSTRACT

Disclosed herein is a hybrid error concealment method. The hybrid error concealment method of the present invention includes a first step of calculating a side match distortion, measured when a motion vector for an arbitrary intra-frame is assumed to be zero, and the intra-frame is temporally reconstructed, a second step of applying temporal error concealment when the side match distortion, calculated at the first step, is less than a predetermined low threshold value, a third step of applying spatial error concealment when the side match distortion, calculated at the first step, is greater than a predetermined high threshold value, and a fourth step of performing error concealment based on $\hat{mb}(x,y) = \alpha \cdot \hat{mb}_t(x,y) + \beta \cdot \hat{mb}_s(x,y)$ when the side match distortion, calculated at the first step, exists between the low threshold value and the high threshold value. According to the present invention, the hybrid error concealment method improves PSNR performance compared to a conventional spatial error concealment algorithm used in H.264, and obtains greatly improved performance characteristics, particularly when motion is small and the value of a quantization parameter is relatively low.

5 Claims, 3 Drawing Sheets

HYBRID ERROR CONCEALMENT METHOD

BACKGROUND OF THE INVENTION

1. Field of the Invention

The present invention relates, in general, to an error concealment method and, more particularly, to a hybrid error concealment method, which adaptively combines a temporal error concealment algorithm, applied to intra-frames, with a spatial error concealment algorithm, used in the H.264 standard, so as to combine the advantages of spatial and temporal error concealment methods with each other, thus transmitting real-time video in a network environment in which the packet loss rate is high and the bit rate is relatively low.

2. Description of the Related Art

Generally, as transmission speed increases with the development of technology for links, such as Asymmetric Digital Subscriber Line (ADSL) or cables, the amount of video data transmitted over the Internet is gradually increasing due to a Video-On-Demand (VOD) service, a video streaming service, etc., and such video services have recently gradually extended to the Wireless Internet, ranging from digital broadcasting to mobile devices.

However, the Internet does not currently guarantee Quality-of-Service (QoS) for real-time video transmission, and has instability characteristics indicating that packets may be lost during transmission according to the characteristics of wireless networks, so that several technologies are required to code and transmit video data.

Moreover, video has requirements with respect to bandwidth, signal delay, and loss. First, suitable video quality can be maintained only when video has a minimum bandwidth. Second, in terms of signal delay, streaming video or real-time video must be continuously played without interruption, unlike typical data. Accordingly, if video data arrives late, rather than on time, loss may occur. Finally, if the loss rate increases to some degree due to bit errors or packet loss, video cannot be recognized, so that the loss rate should be considered during a procedure for encoding and decoding video.

In this case, the problem of bandwidth or signal delay is related to a hardware environment on a data transmission path. Accordingly, these requirements for bandwidth or signal delay can be easily satisfied by improving hardware, and can be predicted. In contrast, if loss occurs, the prediction of the occurrence of loss is impossible, and individual cases and extents to which loss occurs vary, so that separate measures should be provided in preparation for the cases and extents of loss.

Therefore, control methods for compensating for loss caused by the occurrence of errors, such as Forward Error Correction (FEC), retransmission, error resilience, or error concealment, capable of maximizing video quality even in the presence of packet loss, are required.

Among the above control methods, FEC is a scheme in which redundant information is added to a bit stream, and is disadvantageous in that, as the number of bits increases, channel capacity is decreased, and performance is degraded when packets are intensively lost for a long period of time. The retransmission method, such as an Automatic Repeat Request (ARQ), is problematic in that it is not suitable for real-time video transmission or streaming in terms of signal delay. Further, error resilience technology is a scheme of minimizing the influence of loss even in the occurrence of packet loss by considering packet loss in the stage of an encoder coding and compressing packets before the packets are transmitted. However, this scheme also has several problems.

Therefore, one technology that has recently received attention is error concealment technology, in which error concealment is performed by a decoder after receiving video data, and lost data is reconstructed using correctly received neighboring information so as to provide image quality suitable to be recognized by human eyes when packet loss occurs.

That is, a video stream is compressed (coded) to be easily stored and transmitted. Such a video stream coded in this way may frequently undergo data loss or may be corrupted during transmission due to channel errors and/or network congestion, and the loss/corruption itself of data appears as a lost pixel value at the time of decoding data.

In order to reduce such defects, a decoder compensates for the lost pixel value by predicting the lost pixel value from other macroblocks within the same image or other images. This operation is called "concealment" or "hiding", and is advantageous in that it can reconstruct data relatively close to original data using the characteristic by which correlation with adjacent information is high, and it does not especially increase transmission capacity and thus reduce the burden of transmission when transmitting data to the network.

Therefore, if error concealment is applied, video quality can be recovered without increasing the burden of transmission costs in an environment in which packet loss occurs. Further, if the above-described error resilience technology is applied together with error concealment, more efficient error resilience can be implemented. On the basis of the above fact, it can be predicted that, if loss occurs in a network, the realization of video quality will be greatly influenced depending on the performance of error resilience and error concealment.

Further, since the preference of consumers recently tends towards compact systems, requirements, such as a very small size, real-time video processing, and excellent image quality, must be satisfied. Technology proposed to meet such requirements is encoding/decoding, that is, CODEC, technology based on the H.264/MPEG-4 Advanced Video Coding (AVC) (hereinafter referred to as H.264) standard.

Recently, a plurality of relatively new error concealment algorithms for improving on the performance of standard error concealment algorithms, which are adopted in H.264, has been proposed. For example, Jung et al. proposed an algorithm disclosed in [reference cited: B. Jung, B. Jeon, M. D. Kim, B. Suh, and S. I Choi, "Selective temporal error concealment algorithm for H.264/AVC," Proc. IEEE International Conference on Multimedia and Expo, vol. 1, pp 411-414, June 2004] in which a lost macroblock is divided into the background and the foreground, whether temporal correlation is high is determined, and error concealment is performed using a plurality of reference frames in consideration of the fact that correlation is decreased when only a single previous frame is used, in the case of the foreground.

Further, Lee et al. proposed an algorithm disclosed in [reference cited: P. J. Lee, H. H. Chen, and L. G. Chen, "A new error concealment algorithm for H.264 Video Transmission", Proc. IEEE Int. Sympo. Intelligent Multimedia, pp 619-622, October 2004] in which the size of a lost macroblock is determined, motion vectors are detected in a plurality of reference frames, and a motion vector having the minimum side match distortion is selected.

Further, Xu et al. proposed an algorithm disclosed in [reference cited: Y. Xu and Y. Zhou, "H.264 video communication based refined error concealment schemes", IEEE Trans. Consumer Electronics, vol. 50, no. 4, pp 1135-1141, November 2004] in which, if the number of intra-coded macroblocks is greater than or equal to the number of inter-coded macroblocks, for adjacent macroblocks, a spatial error concealment algorithm is applied, whereas, if the number of inter-coded macroblocks is greater than the number of intra-coded macroblocks, a temporal error concealment algorithm is applied, so that an error concealment algorithm is adaptively applied depending on the features of adjacent macroblocks.

Further, Panos et al. proposed an algorithm disclosed in [reference cited: P. Nasiopoulos, L. Coria-Mendozal, H. Mansour, and A. Golikeri, "An improved error concealment algorithm for intra-frames in H.264/AVC", Proc. IEEE Int. Symp. Circuits and Systems, vol. 1, pp 320-323, May 2005] in which intra-frames are independently coded and thus correlation with a previous frame may be decreased, but intra-frames are frequently coded to prevent the accumulation of errors. Accordingly, such an algorithm, considering the above two cases together, that is, an algorithm applying temporal error concealment, as well as spatial error concealment, is proposed.

In detail, temporal error concealment is performed, and a macroblock having the minimum value of the sum of absolute differences between boundary values is selected. If the sum of absolute differences is greater than a predetermined reference value, an extracted macroblock value is discarded, and conventional spatial error concealment, currently used in H.264, is used, whereas, if the sum of absolute differences is equal to or less than the reference value, a lost macroblock value is replaced with a macroblock value obtained through temporal error concealment.

Of the above algorithms, the algorithms proposed by Jung et al. and Lee et al. execute only a temporal error concealment algorithm. Further, the algorithms proposed by Xu et al. and Panos et al. adopt a hybrid method, but select only a single method from among temporal error concealment and spatial error concealment, and apply the selected method.

Therefore, since the above-described conventional methods realize only the exclusive application of any one of temporal error concealment and spatial error concealment, they are limited in that it is difficult to provide a service having a required quality in a network base in which a required specification is high, but a provided service environment is relatively poor, as in the case where real-time video is intended to be transmitted in a network environment in which a packet loss rate is high, and a bit rate is relatively low.

SUMMARY OF THE INVENTION

Accordingly, the present invention has been made keeping in mind the above problems occurring in the prior art, and an object of the present invention is to provide a hybrid error concealment method, which adaptively combines a temporal error concealment algorithm, applied to intra-frames, with a spatial error concealment algorithm, used in the H.264 standard, so as to combine the advantages of spatial and temporal error concealment methods with each other, thus transmitting real-time video in a network environment in which the packet loss rate is high and the bit rate is relatively low.

In order to accomplish the above object, the present invention provides a hybrid error concealment method for real-time video transmission in a network environment, comprising a first step of calculating a side match distortion, measured when a motion vector for an arbitrary intra-frame is assumed to be zero, and the intra-frame is temporally reconstructed; a second step of applying temporal error concealment when the side match distortion, calculated at the first step, is less than a predetermined low threshold value; a third step of applying spatial error concealment when the side match distortion, calculated at the first step, is greater than a predetermined high threshold value; and a fourth step of performing error concealment based on $\hat{mb}(x,y)=\alpha\cdot\hat{mb}_t(x,y)+\beta\cdot\hat{mb}_s(x,y)$ when the side match distortion, calculated at the first step, exists between the low threshold value and the high threshold value.

Preferably, at the fourth step, $\alpha$ may be a weight for a macroblock obtained through temporal error concealment, and $\beta$ may be a value obtained by subtracting $\alpha$ from 1.

Preferably, the temporal error concealment used at the second step may employ a temporal error concealment algorithm applied to intra-frames, and the spatial error concealment used at the third step may employ a spatial error concealment algorithm used in H.264 standard.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
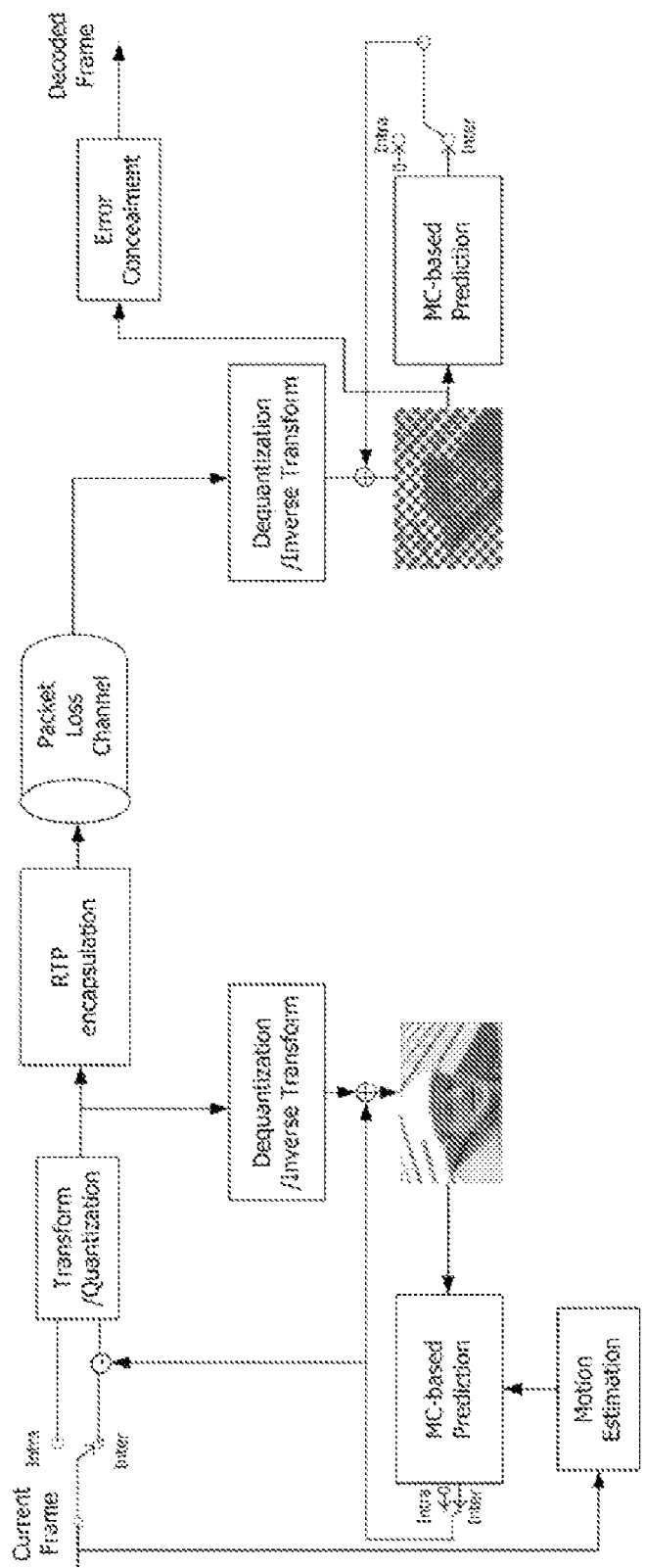
FIG. 1 illustrates an example of an H.264 video transmission procedure in a Real-Time Transport Protocol (RTP)/User Datagram Protocol (UDP)/Internet Protocol (IP) environment.

Hereinafter, embodiments of the present invention will be described in detail with reference to the attached drawings.

First, the technical spirit applied to the present invention is described. H.264/Advanced Video Coding (AVC) has adaptability to various networks together with excellent compression performance. The H.264/AVC is composed of two layers, that is, a Video Coding Layer (VCL) and a Network Abstraction Layer (NAL), which are two conceptual structures, and simultaneously achieves two objects, that is, improved coding efficiency and improved network adaptation.

The VCL includes a core compression technology, and is independent of a network. The VCL provides improved performance from the standpoint of frame prediction, coding efficiency, and recovery from errors and packet loss while accommodating conventional video coding standards.

The NAL supports header information and data coded by the VCL in a format suitable for transmission depending on transport layers, thus enabling easy integration of the header information and the coded data depending on the characteristics and structures of various encoded protocols [reference cited: T. Wiegand, G. Sullivan, J. Bjntegaard, and G. A. Luthra, "Overview of the H.264/AVC video coding standard," IEEE Trans. Circuits Syst. Video Technol, vol. 13, no. 7, pp 560576, July 2003].

Error resilience technologies in H.264 include parameter sets, redundant slices (RS), data partitioning, and Flexible Macroblock Ordering (FMO). The parameter sets can protect critical information required for decoding frames or slices from packet loss by transmitting the critical information in advance through 'out-of-band' transmission, using a reliable transport layer protocol.

RS is a scheme of encoding redundant macroblocks in addition to the original macroblocks of a coded slice, in order to facilitate transmission in high-packet-loss environments (network environments). If an original slice is lost due to packet loss, the lost slice is decoded through a redundant slice. Data partitioning is a scheme of dividing each slice into three parts, that is, part A, including the most important information in decoding, such as the header of each macroblock, a slice header, a macroblock type, and quantization parameters, part B, including data coded using intra-frames, and part C, including data coded using inter-frames, so that coding is performed on the three parts using three Network Adaptation Layer Units (NALU), and coded results are separately transmitted, thus coping with packet loss.

FMO is a scheme of introducing the concept of a slice group, designating a slice group for each macroblock, and flexibly assigning macroblocks to slice groups. Among FMO modes, a dispersed mode disperses and assigns macroblocks to slice groups. If a packet belonging to any one group is lost when two slice groups are used and coding is performed in a checker-board manner, this method can effectively apply error concealment using information about packets belonging to another group [reference cited: T. Sockhammer, M. M. Hannuksela, T. Wiegand, "H.264/AVC in wireless environments", IEEE Trans. Circuits Syst. Video Technol, vol. 13, no. 7, pp 657673, July 2003].

Video transmission methods based on the above schemes are described. When video services, such as video conference or video phones requiring real-time communication, are provided and when video streaming services and previously coded video streams are transmitted over the Internet, the transmission of video data over the Internet uses an Internet Protocol (IP) on a network layer, a User Datagram Protocol (UDP) on a transport layer, and a Real-Time Transport Protocol (RTP) on an application transport layer. In this case, IP provides unstable service without guaranteeing QoS.

UDP is somewhat unstable compared to TCP because it does not perform retransmission for loss, but does not cause additional delay (transmission delay), so that UDP is generally used in real-time video transmission. However, when packets are transmitted using UDP/IP, packets may be lost or be re-ordered, so that RTP, which is a protocol for a higher application transport layer, is employed to report the loss of packets and the relative playback time for packets through a 'sequence number' and 'time stamp' [reference cited: S. Wenger, "H.264/AVC over IP," IEEE Trans. Circuits Syst. Video Technol. Vol. 13, no. 7, pp 645656, July 2003].

FIG. 1 illustrates an H.264 video transmission procedure over the Internet, which shows a procedure for an H.264 encoder performing coding using an intra-frame or inter-frame, mapping a coded frame to NALU, and transmitting the mapped frame in an RTP packet format, and for a decoder decoding the transmitted packet according to an intra-frame or inter-frame and reconstructing lost data through error concealment.

The error concealment procedure is described. Error concealment is performed in macroblocks, and is implemented in such a way that error concealment is performed on a macroblock marked 'lost' in a status map, using neighboring macroblocks marked 'correctly received', and thus the lost macroblock is concealed. If there is no neighboring macroblock that has been correctly received, error concealment is performed using macroblocks marked 'concealed'.

Error concealment can be classified into two cases depending on whether frames are intra-frames or inter-frames, or can be classified into spatial error concealment and temporal error concealment depending on the concealment method.

Spatial error concealment minimizes the influence of an error through interpolation, using information about surrounding pixels of a frame in which an error occurs. Temporal error concealment estimates lost motion information and replaces an erroneous block of a current frame with a block of a previous frame so as to reconstruct the erroneous block.

Such a concealment method is described using spatial error concealment for inter-frames as an example. In the case of intra-frames, since coding is performed on the basis of primarily encoded macroblocks in a current frame, not previous frames, error concealment is spatially performed in two-dimensional space.

Figure 2:
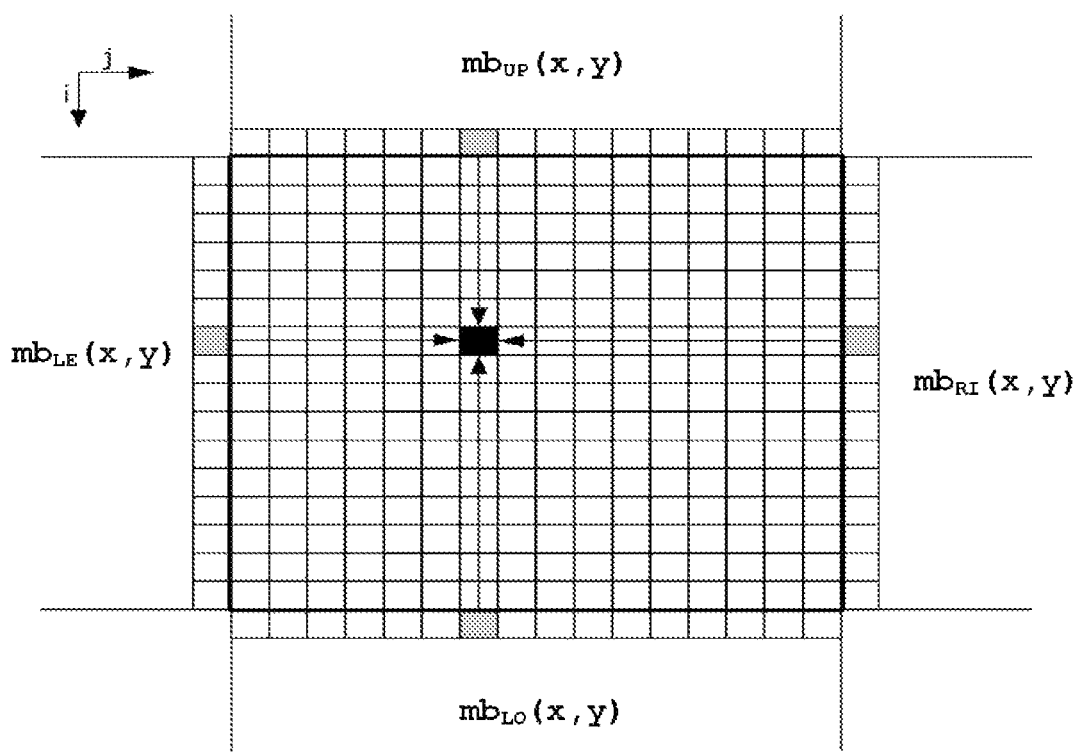
FIG. 2 illustrates an example of an error concealment algorithm for intra-frames based on a weighted pixel averaging method.

As shown in FIG. 2, error concealment is performed on the basis of a weighted pixel averaging method of calculating weights in inverse proportion to the distance between pixels and obtaining the average of the weights [reference cited: Y.-K. Wang, M. M. Hannuksela, V. Varsa, A. Hourunranta, and M. Gabbouj, "The error concealment feature in the H.26L test model", Proc. IEEE Int. Conf. Image Processing, pp 729-733, 2002].

If it is assumed that the vertical and horizontal coordinate values of each macroblock are x and y, the vertical and horizontal coordinate values of each pixel, constituting the macroblock, are i and j, and neighboring macroblocks in upper, lower, left and right locations are $mb_{UP}(x,y)$, $mb_{LO}(x,y)$, $mb_{LE}(x,y)$, and $mb_{RI}(x,y)$, respectively, adjacent vectors used for error concealment are defined by the following Equation [1].

$$UP(j)=mb_{UP}(15,j):0 \leq j<16$$

$$LO(j)=mb_{LO}(0,j):0 \leq j<16$$

$$LE(i)=mb_{LE}(i,15):0 \leq i<16$$

$$RI(i)=mb_{RI}(i,0):0 \leq i<16 \quad [1]$$

In this case, weights for spatial error concealment are obtained using the following Equation [2].

$$w_{UP}(i)=16-i$$

$$w_{LO}(i)=i+1$$

$$w_{LE}(j)=16-j$$

$$w_{RI}(j)=j+1 \quad [2]$$

A macroblock $\hat{mb}_s(i,j)$ reconstructed through weighted pixel averaging is obtained using the following Equation [3].

$$\hat{mb}_s(i,j) = \frac{w_{UP}(i) \cdot UP(j) + w_{LO}(i) \cdot LO(j) + w_{LE}(j) \cdot LE(i) + w_{RI}(j) \cdot RI(i)}{w_{UP}(i) + w_{LO}(i) + w_{LE}(j) + w_{RI}(j)} \quad [3]$$

This method is performed using only correctly received macroblocks when the number of correctly received neighboring macroblocks is two or more, but is performed using neighboring macroblocks reconstructed through error concealment when the number of correctly received neighboring macroblocks is less than two. Therefore, it can be predicted that the performance of error concealment is greatly influenced depending on the number of correctly received neighboring macroblocks.

Temporal error concealment for inter-frames, different from the above-described spatial error concealment for inter-frames, is described. Since inter-frames are coded with reference to a previous frame, motion vectors (MV) for lost macroblocks are predicted with reference to motion information about macroblocks which are spatially adjacent in two-dimensional space or are temporally adjacent, thus performing error concealment.

If the average motion vector of correctly received slices is less than a predetermined value, each lost macroblock value is replaced with a value at a corresponding location in a reference frame, whereas, if the average motion vector is equal to or greater than the predetermined value, error concealment is performed on the basis of a Boundary Matching Algorithm (BMA).

The minimum unit of motion vectors has a block size of 8×8. When each adjacent macroblock is divided into 4×8, 8×4 or 4×4 blocks, the average of the motion vectors of the macroblocks is obtained, and a motion vector corresponding to an 8×8 block size is used.

Candidate macroblocks include four macroblocks, which are obtained using motion vectors of neighboring macroblocks in upper, lower, left and right locations, and a macroblock, which has a motion vector of 0 and is placed at a corresponding location in a reference frame, and a lost macroblock is reconstructed using a macroblock, having a minimum side match distortion $d_{sm}$ between neighboring macroblocks, among the candidate macroblocks.

Figure 3:
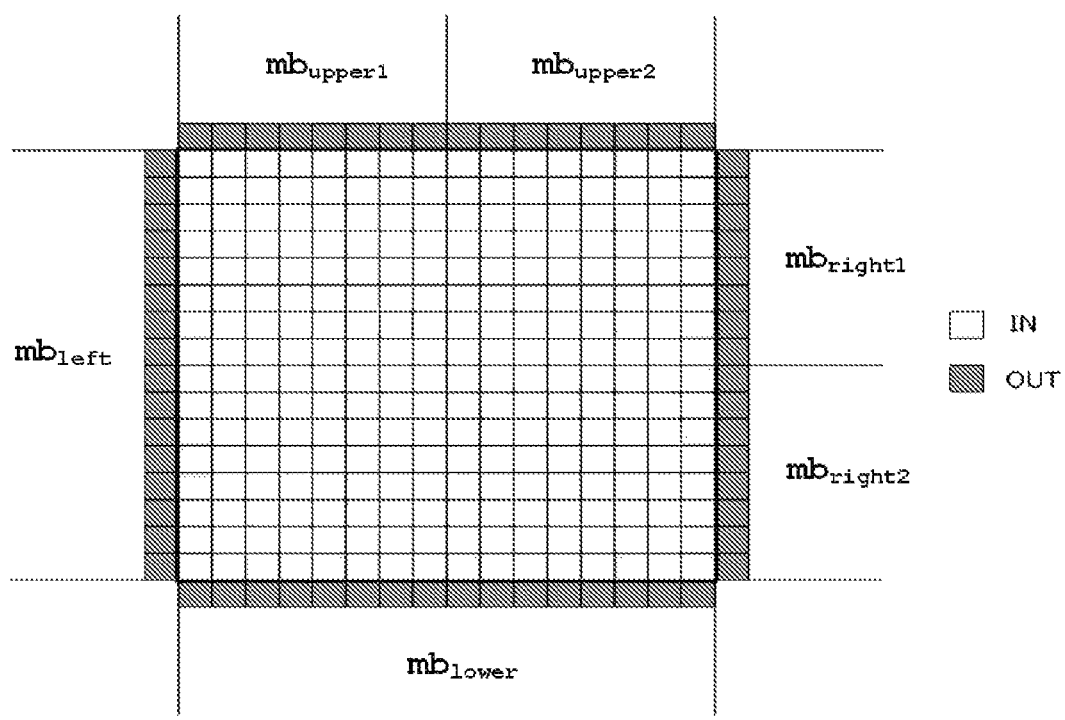
FIG. 3 illustrates an example of an error concealment algorithm for inter-frames based on a Boundary Matching Algorithm (BMA).

FIG. 3 illustrates an example of an error concealment method for inter-frames based on BMA. In order to obtain side match distortion, the following Equation [4] is used as a criterion.

$$d_{sm} = \sum_{j=1}^{N} |\hat{y}(mv^{dir})_j^{IN} - y_j^{OUT}|/N \qquad [4]$$

In Equation [4], N is the total number of pixels used for obtaining $d_{sm}$. Referring to FIG. 3, $\hat{y}(mv^{dir})_j^{IN}$, placed in location IN, is the pixel value of a macroblock obtained through motion compensation using a motion vector adjacent to the boundary between neighboring macroblocks, and $y_j^{OUT}$, placed in location OUT, is the pixel value of each neighboring macroblock adjacent to the boundary of a macroblock desired to be reconstructed.

Temporal and spatial error concealment for intra-frames is described corresponding to the temporal and spatial error concealment for inter-frames based on the above process. First, a temporal error concealment procedure for intra-frames is described. In conventional H.264 reference software, only spatial error concealment is applied to intra-frames.

However, since intra-frames may also be correlated with previous frames, in addition to spatial correlation, temporal error concealment can be applied to intra-frames, and thus a temporal error concealment method for intra-frames is proposed.

If the amount of motion is large, performance may not be excellent. However, in the case of a background having a small amount of motion or having no motion, performance may be better than that of spatial error concealment. The proposed temporal error concealment algorithm is a method of placing a motion vector as 0, and replacing a lost macroblock value with a macroblock value placed at a corresponding location in a previous frame, and is shown in the following Equation [5].

[5] $\hat{mb}_t(x,y) = mb_{t-1}(x,y)$

In Equation [5], $\hat{mb}_t(x,y)$ is a macroblock obtained by performing temporal error concealment on a current frame, $mb_{t-1}(x, y)$ is a macroblock in a previous frame, placed at the same location as the above macroblock, and x and y are vertical and horizontal location coordinates of a macroblock, respectively.

Temporal error concealment can be simply performed, without performing motion compensation based on the motion vectors of macroblocks immediately adjacent to a lost macroblock and comparing values with each other, thus remarkably reducing the complexity of calculation.

In the present invention, an intra-frame is coded using neighboring macroblocks in the same slice of a current frame, but is also correlated with a previous frame. Accordingly, the present invention is proposed in consideration of the fact that, if a temporal error concealment algorithm is applied to a lost macroblock in combination with a spatial error concealment algorithm, the quality of video can be improved while the complexity of calculation can be reduced. The present invention adaptively combines a temporal error concealment algorithm, applied to intra-frames, with a spatial error concealment algorithm, used in H.264.

Hereinafter, a preferred embodiment of the present invention will be described in detail with reference to the attached drawings. In this embodiment, in order to adaptively combine spatial error concealment with temporal error concealment, rather than apply only spatial error concealment to a lost macroblock, a weighted averaging method employed in H.264 is used for the spatial error concealment, and a temporal error concealment method for intra-frames, described based on Equation [5], is used for the temporal error concealment. Therefore, the above methods are used in combination with each other.

The hybrid error concealment algorithm according to the present invention can be defined by the following Equation [6].

$$\hat{mb}(x, y) = \alpha \cdot \hat{mb}_t(x, y) + \beta \cdot \hat{mb}_s(x, y) \qquad [6]$$

$$\beta = 1 - \alpha, \quad 0 \leq \alpha \leq 1$$

In Equation [6], $\alpha$ is a weight for a macroblock obtained through temporal error concealment. Further, i and j are vertical and horizontal pixel coordinates, and can be represented by $16x \leq i < 16(x+1)$ and $16y \leq j < 16(y+1)$, respectively. Further, $p_t(i,j)$ is a pixel value placed at coordinates (i,j) in a current frame, and $p_{t-1}(i,j)$ is a pixel value placed at a corresponding location (i,j) in a previous frame.

In this case, $\alpha$ is determined by D, which is the sum of side match distortions that are measured when temporal error concealment is applied in H.264. D is calculated using the following Equations [7] and [8].

$$D_{UP} = \sum_{j=0}^{15} |p_{t-1}(16x, 16y+j) - p_t(16x-1, 16y+j)| \qquad [7]$$

$$D_{LO} = \sum_{j=0}^{15} |p_{t-1}(16x+15, 16y+j) - p_t(16x+16, 16y+j)|$$

$$D_{LE} = \sum_{j=0}^{15} |p_{t-1}(16x+i, 16y) - p_t(16x+i, 16y-1)|$$

-continued $$D_{RI} = \sum_{j=0}^{15} |p_{t-1}(16x+i, 16y+15) - p_t(16x+i, 16y+16)|$$

In Equation [7] $D_{UP}$, $D_{LO}$, $D_{LE}$, and $D_{RI}$ are measured side match distortions in upper, lower, left, and right locations, respectively, and D is the sum thereof and is obtained using the following Equation [8].

$$D = D_{UP} + D_{LO} + D_{LE} + D_{RI} \quad [1]$$

If the value of D is less than a low threshold value $T_l$, only temporal error concealment is applied, and α is 1,whereas, if the value of D is greater than a high threshold value $T_h$, only spatial error concealment is performed, and α is 0. If the value of D exists between $T_l$ and $T_h$, hybrid error concealment is applied.

As described above, if the value of D exists between $T_l$ and $T_h$, α is obtained to be linearly decreased for D. As described above, the weight α, adaptively determined by D, is summarized and expressed by the following Equation [9].

$$\alpha = \begin{cases} 0, & D \geq T_h \\ \frac{-1}{T_h - T_l} \cdot D + \frac{T_h}{T_h - T_l}, & T_l < D < T_h \\ 1, & D \leq T_l \end{cases} \quad [9]$$

In Equation [9], $T_l$ and $T_h$ are determined through a 'moving average' method of considering the values of D of a previous frame to some extent and considering the value of D of a current frame to the maximum extent.

$T_l$ and $T_h$ are functions of D and can be experimentally determined, and simulation is performed by setting $T_l$ to 2.8 times the average value of D, and $T_h$ to a maximum value of D.

The 'moving average' of the average value of D and the maximum value of D can be defined by the following Equation [10].

$$\hat{D}_{avg} = (1-\gamma) \cdot \hat{D}_{avg} + \gamma \cdot D_{avg} \quad [10]$$

$$\hat{D}_{max} = (1-\gamma) \cdot \hat{D}_{max} + \gamma \cdot D_{max}$$

EXPERIMENTAL EXAMPLE

After the value of a parameter γ is set to 0.3 in Equation [10], simulation was conducted using Equations [6] to [10].

An experimental environment is focused on the transmission of CIF video images named 'Foreman', 'Mobile', 'Mother and Daughter' based on H.264/AVC through the Internet, and an output file format is simulated in a Real-Time Transport Protocol (RTP) packet mode using H.264 JM9.3 version code [reference cited: H.264/AVC software coordination. http://bs.hhi.de/suehring/].

In this case, a dispersed mode, among error resilience technologies FMO in H.264, was applied to the simulation. C code, in which arbitrary packets are discarded from a bit stream composed of RTP packets, [reference cited: S. Wenger, "Common conditions for wire-line, low delay IP/UDP/RTP packet loss resilient testing," ITU-T SG16 Doc. VCEG-N79r1, 2001] and [reference cited: M. Luttrell, S. Wenger, M. Gallant, "New versions of packet loss environment and pseudomux tools", http://www.stewe.org/contrib.htm, Q15-I-09.zip, 1999] was modified, thus the loss of RTP packets was simulated.

An example of the comparison of the performance of a conventional error concealment algorithm and algorithms according to the present invention (Frames 50 to 59) is shown in the following Table 1.

TABLE 1

| | | PSNR | | |
|---|---|---|---|---|
| Image | QP | Spatial error concealment | Temporal error concealment | Hybrid error concealment |
| Foreman | 22 | 24.1626 | 25.0663 | 26.5348 |
| | 34 | 23.8310 | 24.6469 | 26.1292 |
| | 45 | 20.6376 | 21.2713 | 22.9199 |
| Mother and Daughter | 22 | 28.4039 | 29.9541 | 31.0422 |
| | 34 | 28.0681 | 29.2246 | 30.2487 |
| | 45 | 19.7814 | 20.7842 | 22.7076 |
| Mobile | 22 | 18.4034 | 19.3092 | 20.8037 |
| | 34 | 18.2280 | 19.0536 | 20.5728 |
| | 45 | 17.0026 | 17.5877 | 19.2421 |
| Bus | 22 | 20.6139 | 20.2114 | 21.1717 |
| | 34 | 20.2976 | 19.9655 | 20.9767 |
| | 45 | 18.4508 | 13.5147 | 19.7538 |

Further, an example of the comparison of the performance of a conventional error concealment algorithm and algorithms according to the present invention (Frames 90 to 99) is shown in the following Table 2.

TABLE 2

| | | PSNR | | |
|---|---|---|---|---|
| Image | QP | Spatial error concealment | Temporal error concealment | Hybrid error concealment |
| Foreman | 22 | 28.6069 | 31.1329 | 31.2522 |
| | 34 | 25.9810 | 28.5099 | 28.6972 |
| | 45 | 21.5920 | 23.9990 | 24.3373 |
| Mother and Daughter | 22 | 31.1755 | 34.8147 | 34.8207 |
| | 34 | 28.4232 | 31.7872 | 31.9621 |
| | 45 | 21.8209 | 24.4286 | 24.5060 |
| Mobile | 22 | 24.8861 | 26.8371 | 26.8652 |
| | 34 | 21.0413 | 23.4430 | 23.4997 |
| | 45 | 17.4765 | 19.5622 | 19.9296 |
| Bus | 22 | 25.4723 | 27.2237 | 27.3966 |
| | 34 | 22.4125 | 24.2056 | 24.4229 |
| | 45 | 19.0371 | 20.8844 | 21.2855 |

The items shown in Tables 1 and 2 are described in brief. Tables 1 and 2 show the performances of spatial error concealment (spatial EC) used in H.264, the proposed temporal error concealment (temporal EC), and the proposed hybrid error concealment (hybrid EC) by differently setting quantization parameters (QP) to 22, 34 and 45 for images 'Foreman', 'Mother and Daughter', 'Mobile', and 'Bus'.

The tables show that the Peak Signal to Noise Ratio (PSNR) performance is high in descending order of the hybrid error concealment proposed in the present invention, the proposed temporal error concealment, and the spatial error concealment used in H.264.

It can be seen that, when a quantization parameter is 22,the temporal error concealment of the present invention has higher PSNR than that of the conventional spatial error concealment by a maximum of 3.5 dB in the case of the images 'Foreman' and 'Mother and Daughter', having a small amount of motion, and by a maximum of 2.5 dB in the case of the image 'Mobile' having a large amount of motion.

The proposed hybrid error concealment exhibits the improvement of the performance by about 0.5 to 2 dB, compared to the case where only temporal error concealment is applied.

As described above, the present invention provides a hybrid error concealment method, which improves PSNR performance compared to a conventional spatial error concealment algorithm used in H.264, and further improves PSNR performance, particularly when motion is small and the value of a quantization parameter is relatively low.

The hybrid error concealment algorithm of the present invention can further improve PSNR performance more than the case where only a temporal error concealment algorithm is applied, and can be effectively utilized to transmit real-time video in a network environment in which a packet loss rate is high and a bit rate is relatively low.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid error concealment method, performed by a video decoder, for real-time video transmission in a network environment, comprising:
    providing said video decoder;
    receiving a video transmission defined by a series of video frames, each video frame having a plurality of macroblocks formed from a plurality of pixels, wherein upon a determination by the video decoder that a macroblock, from the plurality of macroblocks is lost from the video transmission, said decoder performing the hybrid error concealment in accordance with the following:
    a first step of calculating a side match distortion, measured when a motion vector for an arbitrary intra-frame is assumed to be zero, and the intra-frame is temporally reconstructed;
    a second step of applying temporal error concealment when the side match distortion, calculated at the first step, is less than a predetermined low threshold value;
    a third step of applying spatial error concealment when the side match distortion, calculated at the first step, is greater than a predetermined high threshold value; and
    a fourth step of performing error concealment based on $\hat{mb}(x, y) = \alpha \cdot \hat{mb}_t(x, y) + \beta \cdot \hat{mb}_s(x,y)$ when the side match distortion, calculated at the first step, exists between the low threshold value and the high threshold value, and wherein:
    mb is a macroblock;
    x, y are vertical and horizontal location coordinates of a macroblock;
    $\alpha$ is a weight for a macroblock obtained through a temporal error concealment and $\beta$ is a weight for spatial error concealment;
    $\hat{mb}_t(x, y)$ is a vertical and horizontal coordinate macroblock value obtained by performing a spatial error concealment; and
    $\hat{mb}_s(x, y)$ is a vertical and horizontal coordinate macroblock value obtained performing a temporal error concealment.

2. The hybrid error concealment method according to claim 1, wherein $\beta$ is a value obtained by subtracting $\alpha$ from 1.

3. The hybrid error concealment method according to claim 1, wherein the temporal error concealment used at the second step employs a temporal error concealment algorithm applied to intra-frames.

4. The hybrid error concealment method according to claim 1, wherein the spatial error concealment used at the third step employs a spatial error concealment algorithm used in H.264 standard.

5. The hybrid error concealment method according to claim 1, wherein the side match distortion calculated at the first step is obtained by calculating side match distortions $D_{UP}$, $D_{LO}$, $D_{LE}$, and $D_{RI}$, which are measured in upper, lower, left and right locations, respectively, through the following equation, and by obtaining the sum of the side match distortions measured in respective locations:

$$D_{UP} = \sum_{j=0}^{15} |p_{t-1}(16x, 16y + j) - p_t(16x - 1, 16y + j)|$$

$$D_{LO} = \sum_{j=0}^{15} |p_{t-1}(16x + 15, 16y + j) - p_t(16x + 16, 16y + j)|$$

$$D_{LE} = \sum_{j=0}^{15} |p_{t-1}(16x + i, 16y) - p_t(16x + i, 16y - 1)|$$

$$D_{RI} = \sum_{j=0}^{15} |p_{t-1}(16x + i, 16y + 15) - p_t(16x + i, 16y + 16)|$$

and wherein:
    i and j are vertical and horizontal pixel coordinates, and $p_t(i, j)$ is a pixel value placed at coordinates in (i, j) in a current video frame, and $P_{t-1}(i, j)$ is a pixel value placed at a corresponding location (i, j) in a previous video frame.

* * * * *